Oct. 7, 1952     J. HALTENBERGER     2,613,085
MOTOR VEHICLE FENDER AND FENDER SHIELD CONSTRUCTION
Filed Nov. 27, 1948
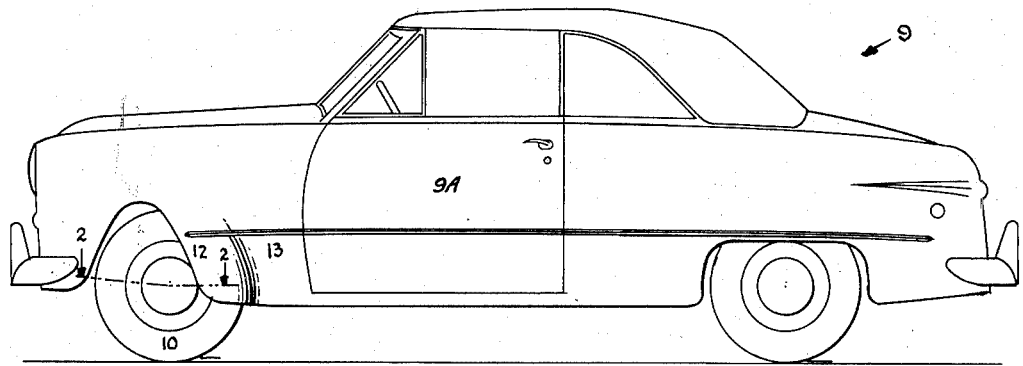
Fig.1.
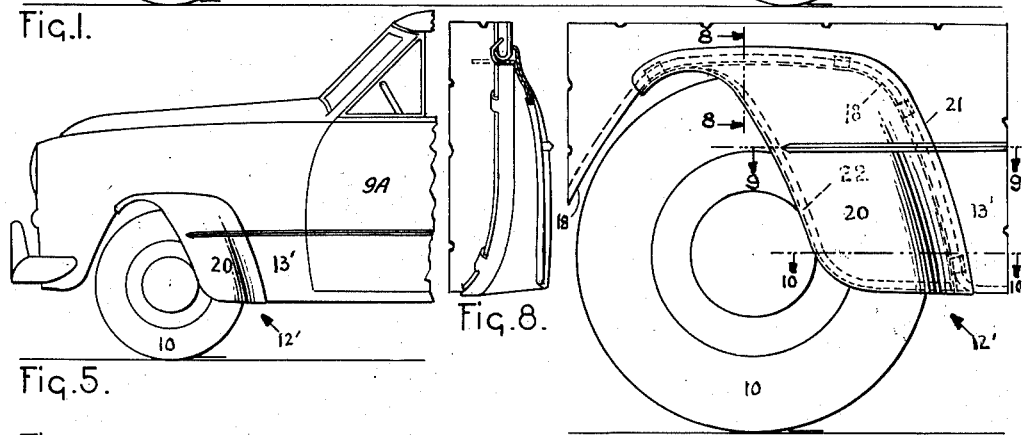
Fig.5.    Fig.8.    Fig.6.
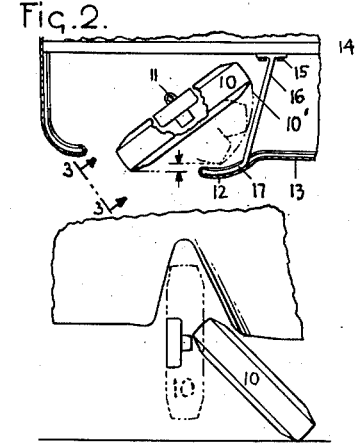
Fig.2.
Fig.3.
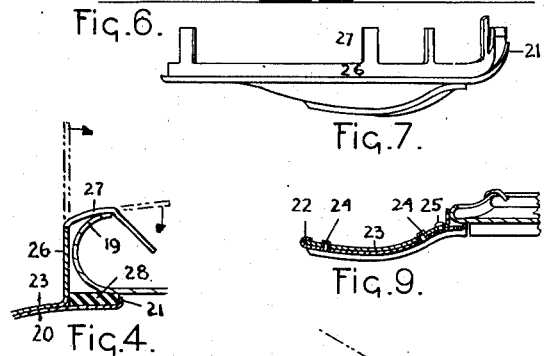
Fig.7.
Fig.4.
Fig.9.
Fig.10. Inventor
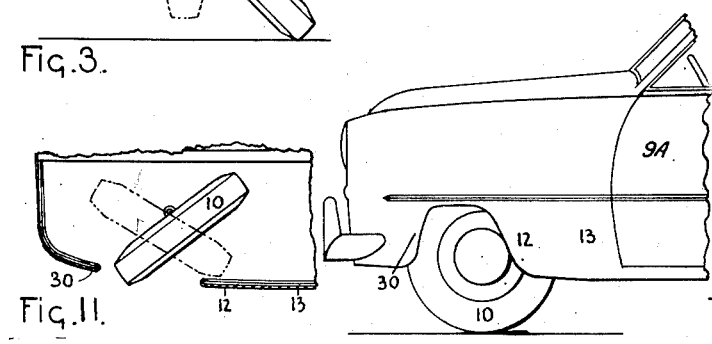
Fig.11.    Fig.12.

Patented Oct. 7, 1952

2,613,085

UNITED STATES PATENT OFFICE 2,613,085

MOTOR VEHICLE FENDER AND FENDER SHIELD CONSTRUCTION

Jules Haltenberger, La Jolla, Calif.

Application November 27, 1948, Serial No. 62,361

6 Claims. (Cl. 280—153)

1

Automobiles now in use, with possibly one exception, have a front end side construction, wherein a wheel exposing opening is provided, completely exposing the tire carrying steerable front wheel for lateral removal of the same, when so desired.

Lateral wheel removal, though traditional, is not compulsory in fact it is not desirable. It is here proposed, to remove the front wheel, at the substantially maximum steering angle position of the wheel, a position where the usually supplied wheel removal wrench is more conveniently applicable.

Angularly placed wheel removal does permit the forwardly continuation of the front end side construction, to overlap mask or cover the rear upper quarter of the wheel disposed above the usual road clearance, for the always desired length increasing effect. It is very desirable to cover that portion of the front wheel that permits the wheel to throw and fling the road slush and mud on the side of the automobile (and other automobiles), damaging the metal protecting coating or paint. It is desirable to prevent the wheel from flinging the road slush and mud upwardly and even forwardly of the wheel and outside of the automobile side construction where a usual cross wind deposits same on the windshield and side windows, endangering the process of driving.

It has been proposed to completely surround the front wheel above the usual road clearance, by a front end side construction. This method entails a rare but great danger, in fact the rarity of the occasion increases the value of the danger. Those who drive automobiles experienced the surprise that under certain—though rare—winter driving conditions, shortly after leaving the automobile in a heated place, large chunks of "built up" ice in size up to 20 inches, in weight up to 10 to 20 lbs. fall to the ground from the wheel cavities. Ice formation of this sort does not harm the operation of the encased rear wheel, or the front wheel during straight driving, however built up ice on the inner side of the construction and in the path of the wheel to be steered interferes with and makes for very hazardous driving.

In the present application, applicant harnesses the direct ram air to prevent build up of ice formations between the outer rear surface of the front wheel and adjacent inner surface of the side construction, therefore, leaving the wheel access opening constantly open. This opening and entering ram air also erves to cool the tires.

2

Steering geometry demands that when driving in a curve the inner wheel be turned to a greater steering angle than the outer one, and correspondingly the inner wheel front end protrudes more from the vehicle than the rear end. Applicant by covering only the rear end of the front wheel reduces the total width of the automobile 4 to 6 inches as compared to a complete side construction covering.

In some parts of the land, usually referred to as gumbo countries, a mud composition of unusual wheel adhering quality is prevalent. To prevent large mud chunks interfering with the steering angle, applicant provides a mud scraping rod and harnesses the ram air to blow the mud rearwardly and away from the wheel steering path.

One of the objects of the invention is to provide an automobile front end side construction which is substantially a continuation, to mask or cover the upper rear quarter of the front wheel, and this is easily accomplished, by slightly changing the side construction dies. For automobiles now in use, applicant provides a front wheel mask or cover lid in the form of an attachment, arranged to be secured to the side construction, and in the preferred form in the simplest permanently securing way. Applicant in his U. S. Patent Re. 20,857 proposed a fender accessory for the complete closing of the rear wheel, wheel exposing opening, wherein the consideration of complete closing, quick releasability for tire change and quick reclosability were paramount. In this application the reduced size attachment or accessory is preferably permanently secured.

Further objects will appear as the description proceeds.

Referring to the drawings: Fig. 1 is a side elevation of an automobile; Fig. 2 is a section substantially on line 2—2 of Fig. 1; Fig 3 is a view seen substantially from line 3—3 of Fig 2; Fig. 4 is an enlarged view of the method of attachment when an accessory form is used; Fig. 5 is similar to Fig. 1 here however a mounted accessory is illustrated; Fig. 6 is an enlarged and more detailed view of a portion of Fig. 5; Fig. 7 is a top view of the accessory before securing, shown in side elevation in Fig. 6; Fig. 8 is a section substantially on line 8—8 of Fig. 6; Fig. 9 is a section substantially on line 9—9 of Fig. 6; Fig. 10 is a section substantially on line 10—10 of Fig. 6; Fig 11 is a section similar to Fig. 2, here however, the side construction conforms to a usual boat side; Fig. 12 is a side elevation of Fig. 11.

Referring to Figs. 1, 2 and 3, it will be seen that an automobile, generally at 9, is provided with a usual front door 9A here indicating a generally flat outer surfaced door (though it might be replaced with a usual door having a usual lower surface bulge in usual surface continuation with a front fender, not shown) and having a tire covered steerable front wheel 10 in a usual downwardly open front wheel chamber, steerably operating on a usual king bolt 11, here however, a part of the wheel lateral area defined by the tire outside diameter, namely the top rear quarter and thereto corresponding part of the wheel periphery line, is masked, hidden or covered by a fixed lid portion 12. Portion 12, in the preferred form, is a part of a usual encompassing stationary structure, providing an integral depending front and adjacent wall downwardly terminating substantially at the level of the wheel centerline, and is a forward surface continuation of the usual body front door 9A and side construction 13.

In automobiles now in production, a simple die change would easily permit the addition of portion 12, and in such form of adaptation, as is clear from Fig. 2, it might have the shape of a usual wheel bulge.

When the front end of the automobile is lifted in the usual manner, for wheel removal or mounting, as is clear from Figs. 2 and 3, the therein illustrated left wheel is angularly disposed, in substantially extreme left steering angle position, and the wheel is facilely removable and re-mountable.

All automobile front end side constructions are formed of thin materials, usually of sheet steel and are braced to the frame or to its equivalent. As is clear from Fig. 2, to the frame 14 as by bolts 15 is secured a usual brace rod 16 having a bent end portion 17. This portion is disposed in the usual in-turned U channel of the side construction, and secured thereto in any desired manner (not shown). Applicant places this brace rod at a slight angle to the lateral, to approach and be disposed nearer the wheel outside travel arc 10' where it is arranged to serve also as a wheel mud scraper. By this process a large chunk of mud is prevented from impeding the wheel angle travel, and the smaller particles are constantly blown rearwardly by the ram air.

As is clear from Fig. 1 the addition of portion 12, while providing a downwardly open downwardly tapering wheel access opening, materially increases the length effect of the automobile and will keep the side and windshield clear from self-deposited slush and mud.

Whereas in practically all automobiles the wheel exposing opening is a large gaping hole of materially larger area than the top half of the wheel, applicant's proposal reduces this hole to an area of materially less than the top half area of the wheel, thereby, reducing the aerodynamical air drag and gasoline consumption respectively.

For automobiles now in use and as an expedient, and as is clear from Figs. 4 to 10 inclusive, applicant provides in place of part 12 an attachment part generally indicated at 12'.

In front end side construction 13' where a usual wheel exposing opening 18, having a larger diameter than wheel 10 and having a larger area than the wheel is to be found on practically all automobiles. This opening is defined by a usual in-turned U channel 19 in practically all automobiles applicant is aware of.

The proposed cover 12' is formed of an outer cover 20 having a rectangular outside edge 21 arranged to overlap the side construction 13'. Cover 20 at its inner end is provided with an overlapping edge 22 arranged to hold and secure the inner edge of a mating inner cover 23 and is further secured thereto by decoration mold holding nuts 24 and rivet 25.

Inner cover 23 on its outer periphery is provided with an inturned continuous wall portion 26, and integral therewith bendable securing fingers 27 are provided.

The space between wall 26 and edge 21 might be provided with a rubber antiscratch or sealer 28 as shown in Fig. 4 or might be left empty as shown in the other figures, as applicant depends on the inside of wall 26 and therewith integral wall 23 to control the slush and mud splashing out from the wheel housing.

It is important to note that finger 27 has a substantially parallel section, therefore, when bending pressure is imposed on the finger end, it will bend at the base where it joins wall 26. Applicant carefully predetermines the lateral width of wall 26 and thereto joining base of finger 27 respectively, in relation to the lateral width of the U channel, with the result, that finger 27 in the first part of the bending process, immediately after contacting the inside, acts as an accessory pull-in lever, firmly and tensionally and in rattle proof relation securing the accessory in place.

The attachment mounting consists of the simple process of placing same on the side construction by a lateral movement, and while holding it from the outside bending the fingers 27 from the inside around the channel.

When it is desired to use a single wall in the cover, applicant proposes that wall 26 be provided with a laterally outward continuation terminating at the edge 21 where this edge is changed to an overlapping edge similar to 22 will serve as securing means between the cover 20 and wall 26 (not shown).

In Figs. 4 to 10 inclusive applicant illustrates an accessory provided with an outward bulge for tire clearance, in some of the latest automobiles the fender side construction is at a materially increased distance from the wheel permitting the use of an accessory masking wall without a bulge or substantially in a surface continuation from the front door on to the wheel access opening (not shown).

When it is desired to provide the automobile with smooth integral front end side construction, this is illustrated in Figs. 11 and 12, where for simplicity of presentation the numerals are duplicated, here however, a further masking or covering portion 30 is provided to reduce aerodynamical drag and gasoline consumption respectively, while providing a ram air and wheel change access opening. This construction, by materially exposing the front of wheel at one extreme steering position, 4 to 6 inches narrower width automobile is arrived at as compared to a completely closed front end side construction when on an equal wheel tread.

In the appended claims all claim words are meant as normally used in relation to a normal automobile while in a normal position, except when extreme steering position is cited.

What applicant claims as his invention:
1. In an automobile having front doors, demountable front steering wheels, a fender construction shrouding said wheels including a substantially vertical outer wall in surface continuation with said doors, having a downwardly opening wheel removal opening and a substantially fixed portion of said wall extending downwardly and forwardly constantly masking the rear top quarter of said wheel, the fixed portion clearing the steering wheels on steering movement thereof in each direction, said fixed portion limiting the opening size thereby permitting the demounting removal of said front steering wheels while in one extreme of angular disposition with the forward side of the tire extending through said opening.

2. The invention set forth in claim 1, wherein the masking portion over the rear top quarter of the wheel is an accessory.

3. With an automobile having front doors, front steering wheels, front fender structures over each of the steering wheels having an upper portion and with front and rear portions extending down around and at least to the horizontal center of the front steering wheels, said fender structure having depending/outer masking portions in surface continuation with said doors covering the rear upper quarter of the steering wheels and tires and being disposed outwardly to clear the rear portions of the tires on steering movement of the wheels, and forward portions depending from the front portions of the fender structure clearing the forward parts of the tires and wheels on steering movement thereof and disposed inwardly toward the center of the automobile with respect to and from the line of the rear depending portions, and said depending portions having a downwardly tapered opening between the forward portions and rear masking portions of appreciably less width than the diameter of the wheel and tire through which the wheel and tire forward parts extend angularly and are accessible for removal when in outer extreme of steering adjustment.

4. The invention disclosed in claim 3, wherein the masking portion for the rear upper quarter of each steering wheel is an accessory.

5. With an automobile having front doors, front steering wheels, front fender structures for each of the steering wheels having an upper portion and with front and rear portions spaced from the wheel extending down and around and at least to the horizontal center of the front steering wheels, said fender structure having depending outer masking portions in surface continuation with said doors covering the rear upper quarter of the steering wheels and tires and being bowed outwardly to clear the wheels and tires upon steering movement of the wheels, and forward portions depending from the front portions of the fender structure clearing the forward parts of the tires and wheels on steering movement thereof and disposed inwardly with respect to and from the bowed out rear depending portions, and said depending portions being spaced apart and having a downwardly tapering opening between the rear and forward portions of appreciably less width than the diameter of the wheel and tire through which the wheel and tire forward parts extend angularly when in outer extreme of steering adjustment.

6. The invention set forth in claim 5, wherein the rear masking portion is an accessory applied to and bowed out beyond the side of an automobile body fender of ordinary construction.

JULES HALTENBERGER.

REFERENCES CITED

The following references are of record in the file of this patent:

UNITED STATES PATENTS

| Number | Name | Date |
| --- | --- | --- |
| D. 150,578 | Kasnicka | Aug. 17, 1948 |
| 1,567,777 | Wampach | Dec. 29, 1925 |
| 2,028,184 | Bergholt | Jan. 21, 1936 |
| 2,139,901 | Lyon | Dec. 13, 1938 |

FOREIGN PATENTS

| Number | Country | Date |
| --- | --- | --- |
| 14,910 | Great Britain | Oct. 26, 1910 |
| 30,071 | Denmark | Aug. 4, 1922 |
| 225,553 | Germany | Sept. 19, 1910 |